United States Patent
Keller et al.

(10) Patent No.: US 6,800,269 B2
(45) Date of Patent: Oct. 5, 2004

(54) SHORT CONTACT TIME CATALYTIC SULFUR RECOVERY SYSTEM FOR REMOVING $H_2S$ FROM A WASTE GAS STREAM

(75) Inventors: Alfred E. Keller, Ponca City, OK (US); Sriram Ramani, Ponca City, OK (US); Joe D. Allison, Ponca City, OK (US); Terry D. Pruitt, Ponca City, OK (US)

(73) Assignee: Conocophillips Company, Houston, TX (US)

( * ) Notice: Subject to any disclaimer, the term of this patent is extended or adjusted under 35 U.S.C. 154(b) by 30 days.

(21) Appl. No.: 10/024,167

(22) Filed: Dec. 18, 2001

(65) Prior Publication Data

US 2002/0131928 A1 Sep. 19, 2002

Related U.S. Application Data

(63) Continuation-in-part of application No. 09/742,999, filed on Dec. 20, 2000, now Pat. No. 6,579,510, which is a continuation-in-part of application No. 09/625,710, filed on Jul. 25, 2000.
(60) Provisional application No. 60/256,285, filed on Dec. 18, 2000, and provisional application No. 60/146,635, filed on Jul. 30, 1999.

(51) Int. Cl.[7] ............................................. C01B 17/04
(52) U.S. Cl. .................................. 423/576.2; 423/576.8
(58) Field of Search ........................... 423/573.1, 576.2, 423/576.8

(56) References Cited

U.S. PATENT DOCUMENTS

| | | | |
|---|---|---|---|
| 1,930,716 A | 10/1933 | Jaegar | 260/57 |
| 2,963,348 A | 12/1960 | Sekkers | 23/225 |
| 4,038,036 A | 7/1977 | Beavon | 23/262 |
| 4,197,277 A * | 4/1980 | Sugier et al. | 423/231 |
| 4,219,445 A | 8/1980 | Finch | 252/443 |
| 4,271,041 A | 6/1981 | Boudart | 252/438 |
| 4,279,882 A | 7/1981 | Beavon | 423/574 |
| 4,311,683 A | 1/1982 | Hass et al. | 423/573 |
| 4,325,842 A | 4/1982 | Slaugh | 252/443 |
| 4,325,843 A | 4/1982 | Slaugh | 252/443 |
| 4,326,992 A | 4/1982 | Slaugh | 252/443 |
| 4,331,544 A | 5/1982 | Takaya | 252/443 |
| 4,406,873 A | 9/1983 | Beavon | 423/574 |

(List continued on next page.)

FOREIGN PATENT DOCUMENTS

| | | | |
|---|---|---|---|
| FR | 2702675 | 3/1993 | ........... B01D/53/36 |
| RU | 2023655 | 11/1994 | |
| WO | WO 97/19019 | * 5/1997 | |

OTHER PUBLICATIONS

Kohl et al. *Gas Purification* 4th. Ed., Gulf Publishing Co. Houston, TX USA, ISBN 0–87201–314–6, pp. 457–460, (1985).*

Claridge, et al, *New Catalysts for the Conversion of Methame to Synthesis Gas: Molybdenum and tungsten Carbide*, J. Catalysis 180, 85–100 (1998).

(List continued on next page.)

*Primary Examiner*—Wayne A. Langel
(74) *Attorney, Agent, or Firm*—Conley Rose PC

(57) ABSTRACT

An apparatus and process for recovering elemental sulfur from a $H_2S$-containing waste gas stream are disclosed, along with a method of making a preferred catalyst for catalyzing the process. The apparatus preferably comprises a short contact time catalytic partial oxidation reactor, a cooling zone, and a sulfur condenser. According to a preferred embodiment of the process, a mixture of $H_2S$ and $O_2$ contacts the catalyst very briefly (i.e, less than about 200 milliseconds). Some preferred catalyst devices comprise a reduced metal such as Pt, Rh, or Pt—Rh, and a lanthanide metal oxide, or a pre-carbided form of the metal. The preferred apparatus and process are capable of operating at superatmospheric pressure and improve the efficiency of converting $H_2S$ to sulfur, which will reduce the cost and complexity of construction and operation of a sulfur recovery plant used for waste gas cleanup.

33 Claims, 5 Drawing Sheets

U.S. PATENT DOCUMENTS

| | | | |
|---|---|---|---|
| 4,481,181 A | | 11/1984 | Norman .................... 423/573 |
| 4,722,799 A | * | 2/1988 | Ashbrook et al. .......... 210/722 |
| 4,797,268 A | | 1/1989 | McGovern et al. ..... 423/574 R |
| 4,814,159 A | | 3/1989 | Voirin ...................... 423/574 |
| 4,886,649 A | | 12/1989 | Ismagilov ................. 423/230 |
| 4,889,701 A | | 12/1989 | Jones et al. ............... 423/220 |
| 4,891,187 A | | 1/1990 | Jungfer et al. ............. 423/248 |
| 4,988,494 A | | 1/1991 | Lagas et al. ............... 423/574 |
| 5,232,467 A | | 8/1993 | Child et al. ............... 48/127.3 |
| 5,338,716 A | | 8/1994 | Triplett ..................... 502/64 |
| 5,397,556 A | | 3/1995 | Towler et al. ............. 423/220 |
| 5,451,557 A | | 9/1995 | Sherif ....................... 502/177 |
| 5,472,920 A | | 12/1995 | Dubois et al. ............. 501/103 |
| 5,512,260 A | | 4/1996 | Kiliany et al. ............ 423/242.1 |
| 5,573,991 A | | 11/1996 | Sherif ....................... 502/177 |
| 5,597,546 A | | 1/1997 | Li et al. .................... 423/573.1 |
| 5,603,913 A | | 2/1997 | Alkhazov .................. 423/230 |
| 5,639,929 A | | 6/1997 | Bharadwaj et al. ........ 585/658 |
| 5,648,582 A | | 7/1997 | Schmidt .................... 585/652 |
| 5,653,953 A | | 8/1997 | Li et al. .................... 423/576.8 |
| 5,654,491 A | | 8/1997 | Goetsch .................... 568/469.9 |
| 5,676,921 A | | 10/1997 | Heisel et al. .............. 423/573.1 |
| 5,700,440 A | | 12/1997 | Li .............................. 423/230 |
| 5,720,901 A | | 2/1998 | De Jong et al. ........... 252/373 |
| 5,807,410 A | | 9/1998 | Borsboom ................. 23/293 |
| 5,814,293 A | | 9/1998 | Terorde et al. ............ 423/576 |
| 5,891,415 A | | 4/1999 | Alkhazov et al. ......... 423/573.1 |
| 5,897,850 A | | 4/1999 | Borsboom ................. 423/576.2 |
| 5,965,100 A | | 10/1999 | Khanmamedov ......... 423/576.8 |
| 6,017,507 A | | 1/2000 | Nougayrede et al. ..... 423/573.1 |
| 6,083,471 A | * | 7/2000 | Philippe et al. ........... 423/573.1 |
| 6,099,819 A | | 8/2000 | Srinivas et al. ............ 423/573.1 |
| 6,103,206 A | | 8/2000 | Taylor, Jr. et al. ......... 423/210 |
| 6,103,773 A | | 8/2000 | Wittenbrink et al. ...... 518/702 |
| 6,235,259 B1 | * | 5/2001 | Ledoux et al. ............ 423/573.1 |
| 6,372,193 B1 | * | 4/2002 | Ledoux et al. ............ 423/573.1 |
| 6,488,838 B1 | * | 12/2002 | Tonkovich et al. ........ 423/651 |
| 6,540,975 B2 | * | 4/2003 | Tonkovich et al. ........ 423/656 |
| 6,579,510 B2 | * | 6/2003 | Keller et al. .............. 423/576.2 |
| 6,616,909 B1 | * | 9/2003 | Tonkovich et al. ........ 423/651 |

OTHER PUBLICATIONS

D.A. Hickman, et al., *Synthesis Gas Formation by Direct Oxidation of Methane over Pt Monoliths*, J. Catalysis 138, pp. 267–282 (1992).

A Cybulski and J.A. Moulijin, *Transformation of a Structured Carrier into Structured Catalyst*, Structured Catalysts and Reactors, Marcel Dekker, pp. 599–615, 1998.

M.E.D. Raymont, Role of hydrogen in Claus plants, Hydrocarbon Processing, 177–179 (1975).

Richard K. Kerr, et al. A new sulfur–recovery process: The RSRP, Oil & Gas Journal 230–243 (1982).

M.E.D. Raymont, Make hydrogen from hydrogen sulfide, Hydrocarbon Processing, 139–142 (1975).

R.H. Hass, et al, Process meets sulfur recovery needs, Hydrocarbon Processing 104–107 (1981).

J.A. Lagas, et al. Selective–oxidation catalyst improves Claus process, Oil & Gas Journal, 68–71 (1988).

Z.R. Ismagilov, et al, New Catalysts and Processes For Environment Protection, React. Kinet. Catal. Lett., vol. 55, No. 2, 489–499 (1995).

Kuo–Tseng Li and Ni–Shen Shyu, Catalytic Oxidation of Hydrogen Sulfide to Sulfur on Vanadium Antimonate, Ind. Eng. Chem. Res. 1480–1484 (1997).

J. B. Hyne, *Methods for desulfurization of effluent gas streams*, The Oil & Gas Journal, 64–78 (1972).

B. Gene Goar, *Today's Sulfur Recovery Processes*, Hydrocarbon Processing vol. 47, No. 9, 248–252 (1968).

R. Gene Goar, *First Recycle Selectox unit onstream*, Oil & Gas Journal, 124–125 (1982).

Sung Woo Chun, et al, *Selective Oxidation of H2S to elemental sulfur over $TiO_2/SiO_2$ catalysts*, Applied Catalysis B: Environmental 16, 235–243 (1998).

H. Austin Taylor and Charles F. Pickett, *The Decomposition of Hydrogen Sulphide*, J. Phys. Chem., vol. 31, pp. 1212 (1927).

J. Chao, *Properties of Elemental Sulfur, Hydrocarbon Processing*, 217–223, (1980).

David M. Haaland, *Noncatalytic Electrodes for Solid–Electrolyte Oxygen Sensors*, J. Electrochem. Soc.: Electrochemical Science and Technology, vol. 127, No. 4, 796–804 (1980).

J.W. Mellor, *A Comprehensive Treatise on Inorganic and Theoretical Chemistry*, vol. X, Longmans, Green and Co., New York, 118–119, 128–129, 206–213,221–223,144–148, 152–159,162–166,393–400.

PCT Search Report in PCT/US00/40489, Jul. 26, 2000.

PCT Search Report in PCT/US00/20252, Jul. 26, 2000.

PCT Search Report in PCT/US–01/48792 dated Jul. 8, 2002.

PCT Search Report in PCT/US00/34692 dated Nov. 5, 2001.

PCT Search Report in PCT/US01/48795 dated Jun. 26, 2002 (1 p.).

PCT Search Report in PCT/US00/34692 dated Nov. 5, 2001 (3 pp.).

R.W. Watson et al., "The successful use of oxygen in Claus plants," HTI Quarterly: Winter 1995/96, pp. 95–101.

B.W. Gamson et al., "*Sulfur from Hydrogen Sulfide*," Chem. Eng. Prog., Apr. 1953, vol. 49, No. 4, pp. 203–215.

* cited by examiner

SHORT CONTACT TIME CATALYTIC SULFUR RECOVERY SYSTEM FOR REMOVING H₂S FROM A WASTE GAS STREAM

CROSS REFERENCE TO RELATED APPLICATIONS

This application claims the benefit under 35 U.S.C. §119 (e) of U.S. Provisional Patent Application No. 60/256,440 filed Dec. 18, 2000. This application is also a continuation-in-part of U.S. patent application Ser. No. 09/742,999 filed Dec. 20, 2000 (now U.S. Pat. No. 6,579,510), which is a continuation-in-part of U.S. patent application Ser. No. 09/625,710 filed Jul. 25, 2000, which claims the benefit under U.S.C. §119(e) of U.S. Provisional Patent Application No. 60/146,635 filed Jul. 30, 1999.

BACKGROUND OF THE INVENTION

1. Technical Field of the Invention

The present invention generally relates to sulfur recovery processes and apparatus for removing hydrogen sulfide from waste gas. More particularly, the invention relates to such processes that avoid thermally combusting $H_2S$ and to apparatus that does not include a conventional Claus thermal reactor.

2. Description of the Related Art

In many industrial situations today it is desirable to prepare elemental sulfur from $H_2S$ or gaseous mixtures containing moderate to high concentrations of $H_2S$. Often this is done in conjunction with cleaning up gaseous petroleum feed streams that contain $H_2S$, since sulfur is generally considered undesirable in most petroleum refining products and the quality of the various petroleum fractions may be upgraded by removing the sulfur content. For example, a natural gas stream containing $H_2S$ is treated to remove the $H_2S$, and the $H_2S$ rich gas fed to a modified Claus sulfur recovery unit which converts the $H_2S$ to elemental sulfur. In the modified Claus process, hydrogen sulfide is partially combusted with air in a reaction furnace to form sulfur dioxide. The combustion gases are cooled in a waste heat boiler in which a portion of the uncombusted hydrogen sulfide reacts with sulfur dioxide to form elemental sulfur and water vapor. The partially converted mixture then flows to a condenser where the elemental sulfur is removed in molten form. The remaining gases are then heated and passed over a catalytic converter bed for further conversion to elemental sulfur and then again cooled to condense incremental sulfur. From one to four stages of reheat, conversion and condensing are typically used. FIG. 1 is a flow diagram of a typical prior art Claus plant. A coalescer is sometimes provided to remove entrained liquids (sulfur) from the final condenser tail gas. In many cases, a "tail gas" cleanup unit such as the well-known SCOT unit is utilized to clean up the tail gas from the modified Claus process. Tail gas treatment units process the unreacted $H_2S$, $SO_2$, various compounds such as COS and $CS_2$, and elemental sulfur vapor into $H_2S$ which is then recycled back to the thermal stage of the Claus process. Alternatively, the remaining sulfur containing compounds are converted to $SO_2$ which is absorbed in aqueous solutions to form bisulfite salts. Still other types of tail gas treatments which have been well described in the literature involve operating Claus catalyst beds at temperatures below the dew point of sulfur, or promote the direct oxidation of the remaining $H_2S$ to sulfur over a bed of solid catalyst or in a liquid contacting device. The waste gas emerging from the tail gas unit is typically vented into the atmosphere after incineration of the residual sulfur containing compounds to $SO_2$. The thermal stage of the Claus process is a burner in a refractory lined chamber. $H_2S$ along with other compounds such as $CO_2$, methane and light hydrocarbon gases, nitrogen, ammonia, and hydrogen, is fed to the burner. Air, pure oxygen, or a mixture of both is also fed to the burner. A flame is used to ignite the mixture of gases. In the flame, ⅓ of the $H_2S$ is oxidized by the reaction:

$$H_2S + \tfrac{3}{2}O_2 \rightarrow SO_2 + H_2O \tag{1}$$

The remaining ⅔ of the $H_2S$ then reacts with the $SO_2$ generated in the flame to form elemental sulfur and water:

$$2H_2S + SO_2 \leftrightharpoons 3/xS_x + 2H_2O \tag{2}$$

wherein x=2, 6, or 8. Together, reaction stages (1) and (2) are referred to as the "Claus reaction." The maximum efficiency for conversion to sulfur is given by equilibrium computations best described by Gamson and Elkins (*Chem. Eng. Prog.* (1953) 4 9:203–215) to be 70 to 75%, depending on the flame temperature. The efficiency decreases with decreasing residence time in the reactor. The sulfur formed by the thermal stage is recovered as a liquid by first cooling the hot reaction gases (typically about 1,800–2,700° F.) in a fire tube boiler, followed by condensation in the tubes of a low pressure steam generator. Removing the liquid sulfur allows the equilibrium Claus reaction in reaction (2), above, to shift to the right to form more sulfur. At low temperatures (i.e., below 500° F.) sulfur formation from the Claus reaction is about 90 to 98% efficient, but requires a catalyst to make the reaction go at an acceptable rate. The gas containing the unreacted $H_2S$ and $SO_2$, in the 2:1 ratio required for the Claus reaction, are heated to a temperature which prevents liquid sulfur from condensing in the catalyst bed by varying means. The gas passes over the catalyst and the Claus reaction proceeds until equilibrium is reached. Reactor effluent is cooled and sulfur is again condensed out of the gas stream. The reheat of the gases, catalytic reaction, and sulfur condensation is repeated. Usually, 2 to 3 catalytic stages are employed. Any remaining $H_2S$, $SO_2$, sulfur, or other sulfur compounds in the Claus plant effluent are either incinerated to $SO_2$ and discharged to the atmosphere, or incinerated to $SO_2$ and absorbed by chemical reaction, or converted by hydrogen to $H_2S$ and recycled or absorbed by an alkanolamine solution. This is accomplished by various Claus "tail gas" treatment units, which improve the efficiency of sulfur removal from the gas discharged to the atmosphere.

Over several decades, there have been modifications of the Claus process, mainly involving improvement of the burner design, more active and durable catalysts, different types of reheaters, and in some cases replacing air with oxygen as the oxidizer. Some of the more recent improvements have been directed toward significantly increasing the processing capability of the process. (Watson, et. al., "The Successful Use of Oxygen in Claus Plants," *HTI Quarterly: Winter* 1995/1996 pp. 95–101) The basic $H_2S$ conversion process remains essentially the same, however, since its inception in 1883.

The greatest problem with the Claus process is the inherent equilibrium constraint of the Claus reaction caused by the necessity of generating the $SO_2$ intermediate. Others have addressed this problem by attempting to directly oxidize $H_2S$ to sulfur using alumina based catalysts and low temperature operating conditions. Typically, these processes are catalytic oxidations operating at temperatures below about 454° C., so that the reaction can be contained in ordinary carbon steel vessels. Usually these catalytic oxidation processes are limited to Claus tail gas operations or sulfur recovery from streams that have very low $H_2S$ content (i.e., about 1–3%). One reason for this limited use is that the heat evolved from the oxidation of a concentrated stream of $H_2S$ would drive the reaction temperatures well above 454° C. requiring refractory lined vessels such as the conventional Claus thermal reactor. Low concentration $H_2S$ streams will not produce enough energy release from oxidation to sustain a flame as in a thermal reactor stage. These existing catalytic oxidation technologies are therefore limited to low concentration streams using non-refractory lined vessels. These processes are also limited in the amount of sulfur that can be handled because the heat transfer equipment needed to remove the heat of reaction becomes extremely large due to the low temperature differential between the process and the coolant streams.

Other techniques for improving efficiency of sulfur removal that have been described in the literature include: 1) adsorbing sulfur cooled below the freezing point on a solid material followed by releasing the trapped sulfur as a liquid by heating the solid adsorbent; 2) selectively oxidizing the remaining $H_2S$ to sulfur using air; and 3) selectively oxidizing the $H_2S$ to sulfur employing aqueous redox chemistry utilizing chelated iron salts or nitrite salts in an attempt to purifying hydrogen sulfide contaminated hydrogen or gaseous light hydrocarbon resources. According to these methods, the $H_2S$-contaminated hydrogen or hydrocarbon stream is contacted directly with the redox reagent such as chelated iron (III) ions. The iron (III) is reduced to iron (II) ion while the $H_2S$ is converted to elemental sulfur. The sulfur in liquid form is separated from the solution. These types of desulfurization units have been proven to be practical when the amount of sulfur to be removed from the stream is below 5 long tons per day. The Sulfurox™ and Lo-Cat™ processes are examples of this type of $H_2S$ conversion process. Some of these direct oxidation processes use a liquid media to carry out the oxidation or to act as a carrier for the oxidizer. These processes are also limited in the amount of sulfur recovered due to the heat removal constraints at low temperatures and the need to maintain low temperatures to keep the liquid from boiling. For these reasons, existing direct oxidation processes have not proved to be viable substitutes for the Claus process in most industrial applications.

U.S. Pat. Nos. 5,700,440; 5,807,410 and 5,897,850 describe some of the limitations of existing tail gas treatment (TGT) processes and the difficulty of meeting increasingly stringent government requirements for desulfurization efficiency in the industry. J. B. Hyne (*Oil and Gas Journal* Aug. 28, 1972: 64:78) gives an overview of available processes for effluent gas stream desulfurization and discusses economical and environmental considerations. R. H. Hass et al. (*Hydrocarbon Processing* May 1981:104–107) describe the BSR/Selectox™ process for conversion of residual sulfur in Claus tail gas or for pre-Claus treatment of a gas stream. K-T Li at al. (*Ind. Eng. Chem. Res.* 36:1480–1484 (1997)) describe the SuperClaus™ TGT system which uses vanadium antimonate catalysts to catalyze the selective oxidation of hydrogen sulfide to elemental sulfur. U.S. Pat. No. 5,603,913 describes several oxide catalysts that have been suggested for catalyzing the reaction

$$H_2S + \tfrac{1}{2}O_2 \rightarrow \tfrac{1}{2}S_2 + H_2O \qquad (4)$$

Because reaction (4) is not a thermodynamically reversible reaction, direct oxidation techniques offer potentially higher levels of conversion than is typically obtainable with thermal and catalytic oxidation of $H_2S$. Most direct oxidation methods are applicable to sour gas streams containing relatively small amounts of $H_2S$ and large amounts of hydrocarbons, but are not particularly well suited for handling the more concentrated acid gas streams from refineries. For this reason direct oxidation methods have been generally limited to use as tail gas treatments only, and have not found general industrial applicability for first stage sulfur removal systems from gases containing large quantities of $H_2S$.

Z. R. Ismagilov et al. (*React. Kinet. Catal. Lett.* 55:489–499 (1995)) suggest that monolith catalysts containing oxides of Co, V, Fe, Cr, Mn or Al have activity for catalytically converting the $H_2S$ in natural gas to sulfur in a first oxidation stage. The reaction conditions include a spherical particulate vanadium catalyst in a fluid bed reactor operating at 250–300° C., $O_2:H_2S = 0.5–1.1$ and $t_c = 0.5–0.8$ s. Under such conditions $H_2S$ conversion and process selectivity of 99% is reported.

U.S. Pat. No. 4,886,649 (Ismagilov, et al.) describes a two stage direct oxidation process employing fluidized catalyst beds containing $MgCrO_4$ and $Al_2O_3$, or $V_2O_5$ and $Al_2O_3$. According to that method, oxygen is supplied to the first oxidation stage in an amount of 100–110% of the stoichiometric amount necessary for oxidation of $H_2S$ to elemental sulfur. The range of treatable $H_2S$ containing gases is extended to gases containing about 30–50 vol. % $H_2S$. The granular catalyst in a fluidized bed with a cooling coil or jacket, allows temperature uniformity of the catalyst bed. A maximum temperature level of 250–350° C. is desired in order to avoid forming products of coking and cracking of hydrocarbon components of the feed gas.

In an unrelated area of endeavor, various carbided metal catalysts have been prepared, some of which have been used for catalyzing the oxidative conversion of methane to synthesis gas. For example, Claridge et al. (*J. Catalysis* 180:85–100 (1998)) have described high-surface-area molybdenum carbide catalysts and tungsten carbide catalysts for conversion of methane to synthesis gas via steam reforming, dry reforming or partial oxidation processes. Maintaining elevated pressure during the conversion process stabilized the carbide and deterred catalyst deactivation.

U.S. Pat. No. 4,325,843 (Slaugh et al.) describes a process for making a supported tungsten carbide composition for use as a catalyst. The process includes impregnating an oxidic support material with a solution of a tungsten salt, converting the tungsten to a nitride and treating the supported tungsten nitride with a carbiding gas mixture.

U.S. Pat. No. 4,325,842 (Slaugh et al.) describes a process for preparing a supported molybdenum carbide catalyst by impregnating a porous support with a solution of hexamolybdenum dodecachloride, drying, and heating in a carbiding atmosphere. U.S. Pat. No. 4,326,992 (Slaugh et al.) describes another process for preparing a supported molybdenum carbide catalyst. In this process an ammonium hydroxide solution of molybdic acid is applied to a porous support, dried and heated in a carbiding atmosphere. U.S. Pat. No. 5,338,716 (Triplett et al.) discloses a supported non-oxide metal carbide-containing catalyst that includes an oxide support, a passivating layer, and a non-oxide metal ceramic catalytic component such as tungsten carbide or molybdenum carbide, or another Group VI metal carbide or nitride.

U.S. Pat. Nos. 5,451,557 and 5,573,991 (Sherif) disclose other processes for forming a metal carbide catalyst such as tungsten carbide or another Group VIB transition metal carbide. U.S. Pat. No. 4,331,544 (Takaya et al.) describes a catalyst for catalyzing the synthesis of methane from CO and $H_2$. That catalyst comprises a nickel-molybdenum alloy and a molybdenum carbide supported on a porous carrier. Still other metal carbide catalysts are disclosed in U.S. Pat. No. 4,219,445 (Finch), U.S. Pat. No. 1,930,716 (Jaeger), and U.S. Pat. No. 4,271,041 (Boudart et al.). Carbided catalysts do not appear to have not been previously employed in sulfur recovery processes.

Even though the Claus process still finds widespread industrial use today for recovering elemental sulfur from $H_2S$ that is generated in many industrial processes, such as petroleum refinery processes, and for reducing sulfur emissions from refineries, the Claus process is generally viewed as relatively costly for routine use on a commercial scale. As a result, the Claus process is currently performed mainly for the purpose of complying with government mandated environmental air quality standards. Most of the existing alternative desulfurization processes and systems must resort to use of additional pre-treatments or post-treatment catalytic stages and tail gas treatments in order to adequately clean the waste gas that is vented into the air. A more economical and efficient way of recovering elemental sulfur from an $H_2S$-containing gas stream and of removing environmentally harmful $H_2S$ from gas well emissions and from industrial vent stack exhaust gases is needed.

BRIEF SUMMARY OF PREFERRED EMBODIMENTS

The present invention overcomes major deficiencies of the prior art by providing a process and apparatus in which higher concentrations of $H_2S$ can be directly oxidized to elemental sulfur and water than was previously possible with known methods, catalysts and apparatus. This is accomplished without employing a flame to produce an $SO_2$ intermediate. In many cases the yield of recovered elemental sulfur is also enhanced compared to that of conventional Claus recovery processes and apparatus or existing direct oxidation processes such as Selectox™ and SuperClaus™, which are typically employed for Claus tail gas treatment today. This offers profound advantages for reducing pollution of the air by $H_2S$ escaping from natural gas wells and from petroleum refinery vent stacks. Another advantage of the present apparatus and process is that they can be operated at superatmospheric pressures, which makes possible for the first time a compact sulfur removal plant. The new apparatus and improved process also make it more economically and environmentally feasible for refineries to utilize high sulfur crude oils by providing for the efficient recovery of the accompanying $H_2S$ waste gas. Employing a short contact time reactor and a suitable catalyst such as Pt, Rh, or Pt—Rh, the process allows the direct oxidation of $H_2S$ to take place on gas streams containing a much wider range of $H_2S$ concentrations than is presently possible with conventional $H_2S$ direct oxidation processes and operating at temperatures ranging up to about 1,500° C. By eliminating $SO_2$ formation, the equilibrium constraint of the Claus reaction (2) is removed and the conversion of $H_2S$ to sulfur in the direct oxidation step is urged forward toward completion. Achieving a high level of conversion in the initial direct oxidation stage (1) allows the elimination of the intermediate catalytic stages of the Claus reaction. The avoidance of substantial $SO_2$ formation also eliminates the need for $SO_2$ conversion or absorption from the tail gas of the present invention, a considerable improvement in operability and stability. The optimal operation of a conventional Claus sulfur removal unit is dependent on the air or air/oxygen supplied to the reaction. The optimum recovery is obtained when the gas leaving the Claus unit has an $H_2S$ to $SO_2$ ratio of 2:1. This requires constant manipulation of the air fed to the plant.

By contrast, with the presently disclosed process and apparatus, which substantially avoid making $SO_2$, the recovery is less dependent on fine manipulation of the air or air/oxygen to the reaction. Stability is gained by not having to rely as extensively on analyzers and controls to fine tune the amount of oxidizing gas.

In accordance with one aspect of the present invention, a gas desulfurization assembly for recovering $H_2S$ from a waste gas stream is provided. The assembly comprises a short contact time catalytic reactor having a $H_2S$-containing gas injection inlet, an $O_2$-containing gas injection inlet, a gas mixing zone, and a reaction zone comprising at least one catalyst device having activity for catalyzing the partial oxidation of $H_2S$ to elemental sulfur and water under reaction promoting conditions. The assembly also includes a cooling zone and a sulfur condenser in fluid communication with the cooling zone. The condenser has a liquid sulfur outlet and a desulfurized gas outlet. The injection inlets are in fluid communication with the gas mixing zone, the mixing zone is in fluid communication with the reaction zone, and the reaction zone is in fluid communication with the cooling zone. In some embodiments, the assembly also includes at least one tail gas treatment unit downstream from the sulfur condenser, with a heater placed in between for reheating the process gases before entering the tail gas treatment unit. In preferred embodiments, the reactor is capable of withstanding temperatures in the operating range of the $H_2S$ catalytic partial oxidation reaction, or at least 700° C., preferably up to 1,500° C. A thermal insulator is placed between the mixing zone and the reaction zone to deter excessive heating of the reactant gases prior to contacting the catalytic surfaces. In certain embodiments the cooling zone includes several or many thermally conductive tubes that run through a heat exchanger, to facilitate rapid cooling of the reacted gases. In preferred embodiments the cooling zone also includes at least one thermal insulator between the reaction zone and the thermally conductive tubes. These insulators a preferably a plurality of refractory ferrules each of which is attached to a thermally conductive tube. In some embodiments the cooling zone includes a heat exchanger, and the thermally conductive tubes extend there through.

In accordance with another aspect of the invention, a waste gas desulfurization process is provided. In preferred embodiments the process comprises providing a $H_2S$-containing waste gas stream and a $O_2$-containing stream to a millisecond contact time reactor. In certain embodiments the $H_2S$-containing gas includes at least about 1 vol. % $H_2S$, and in some embodiments the $H_2S$-containing waste gas stream is almost entirely $H_2S$. The $O_2$-containing gas is chosen may be purified $O_2$, air or $O_2$ enriched air. The reactor has a gas mixing zone, a reaction zone capable of withstanding temperatures of at least about 700° C., preferably up to at least 1,500° C., and a cooling zone. The process further includes mixing together the $H_2S$-containing gas stream and said $O_2$-containing gas stream in the mixing zone to form a reactant gas mixture having a molar ratio of $H_2S$ to $O_2$ of about 2:1 or less, the reaction zone containing a catalyst device having activity for catalyzing the partial oxidation of $H_2S$ to elemental sulfur and water under reaction promoting conditions. In certain embodiments the process includes preheating the $H_2S$ and $O_2$ streams up to about 200° C. Preferably the temperature of the mixing zone does not exceed about 200° C. The process also includes maintaining the temperature of the reaction zone between about 700° C.–1,500° C., preferably in the range of 850° C.–1,300° C., and passing the reactant gas mixture over the catalyst device such that the contact time between the catalyst device and a portion of reactant gas mixture that contacts the catalyst device is no more than about 200 milliseconds, preferably under 50 milliseconds, and more preferably less than 20 milliseconds. Less than 10 millisecond contact time is highly preferred. The reaction $H_2S + \frac{1}{2}O_2 \rightarrow 1/x\, S_x + H_2O$ (x=2, 6 or 8) occurs and a product stream is formed that contains gaseous elemental sulfur and water. In some embodiments a substantially desulfurized residual waste gas is also present in the reacted or process gas stream. The process further includes passing the process gas stream into the cooling zone and cooling said product stream to a temperature above the dewpoint of sulfur, to provide a partially cooled product stream. The process still further includes passing the partially cooled product stream to a sulfur condenser and cooling the product stream to the dewpoint temperature of elemental sulfur, or lower, to allow recovery of elemental sulfur from the condenser. In some embodiments the process also includes venting the substantially desulfurized waste gas into the atmosphere, or otherwise disposing of the desulfurized waste gas.

In certain embodiments the desired temperature is maintained by regulating the reactor inlet temperature, the $H_2S$ concentration in the reactant gas mixture and/or by externally applying heat to the catalyst device, or a combination of those actions. Certain preferred embodiments include maintaining autothermal reaction promoting conditions. The term "autothermal" means that substantially no externally supplied heat must be provided to the catalyst in order to sustain the exothermic sulfur catalytic partial oxidation reaction and the $H_2S$ partial oxidation process. The term "SCPOX," as used in this disclosure means "sulfur catalytic partial oxidation," and the term "CPOX" refers to the "catalytic partial oxidation of hydrocarbons."

In preferred embodiments, the catalyst device employed in the process comprises a metal having activity for catalyzing the reaction $H_2S + \frac{1}{2}O_2 \rightarrow 1/x\, S_x + H_2O$, wherein x=2, 6 or 8, under reaction promoting conditions. Ensuring reaction promoting conditions may include adjusting the relative amounts of $H_2S$, $O_2$ and other oxidizable components (e.g., hydrocarbon) in the feed gas mixture. For example, an amount of $O_2$ in excess of the stoichiometric amount of Reaction (4) is preferably provided if hydrocarbons are also present in the feed which are oxidizable over the chosen catalyst. Reaction promoting conditions may also include adjusting the amount of preheating of the reactant gas mixture and/or the catalyst, adjusting the operating pressure of the reactor, which is preferably maintained above atmospheric pressure, more preferably in excess of two atmospheres pressure. Increasing or decreasing the space velocity of the feed gas mixture, which is influenced not only by pressure but also by the configuration of the catalyst bed, its porosity and the associated pressure drop, also can be used to favor the $H_2S$ partial oxidation reaction.

In some embodiments the catalyst device contains a reduced metal such as platinum, rhodium, ruthenium, nickel, palladium, iridium, or a mixture of any of those metals. In some embodiments the catalyst also contains a lanthanide metal or metal oxide, and in certain embodiments the catalyst device comprises a porous refractory catalyst support made of a material such as $Al_2O_3$, $ZrO_2$ or partially stabilized (MgO) zirconia (PSZ). In certain embodiments the catalyst device comprises one or more layers of wire gauze. In some embodiments, the catalyst device comprises a monolith or a packed bed of discrete or divided units or structures, such as regularly or irregularly shaped particles, granules, beads, pills, pellets, cylinders, trilobes, extrudates or spheres. With any of those forms of supported catalyst, a preferred catalytic metal is Pt, Rh, more preferably a Pt-Rh mixture. In some embodiments the catalyst device contains a Pt—Rh alloy supported on a lanthanide, preferably samarium, coated refractory support. In some embodiments, the catalyst device contains a carbided metal, preferably a Pt—Rh mixture.

In some embodiments the process comprises operating the reactor at a space velocity of at least about 100,000 $hr^{-1}$. In preferred embodiments the reactor is operated at superatmospheric pressure. These and other embodiments, features and advantages of the present invention will become apparent with reference to the following description and drawings.

BRIEF DESCRIPTION OF THE DRAWINGS

For a more detailed description of the present invention, reference will now be made to the accompanying Figures, wherein.

DETAILED DESCRIPTION OF PREFERRED EMBODIMENTS

Figure 1:
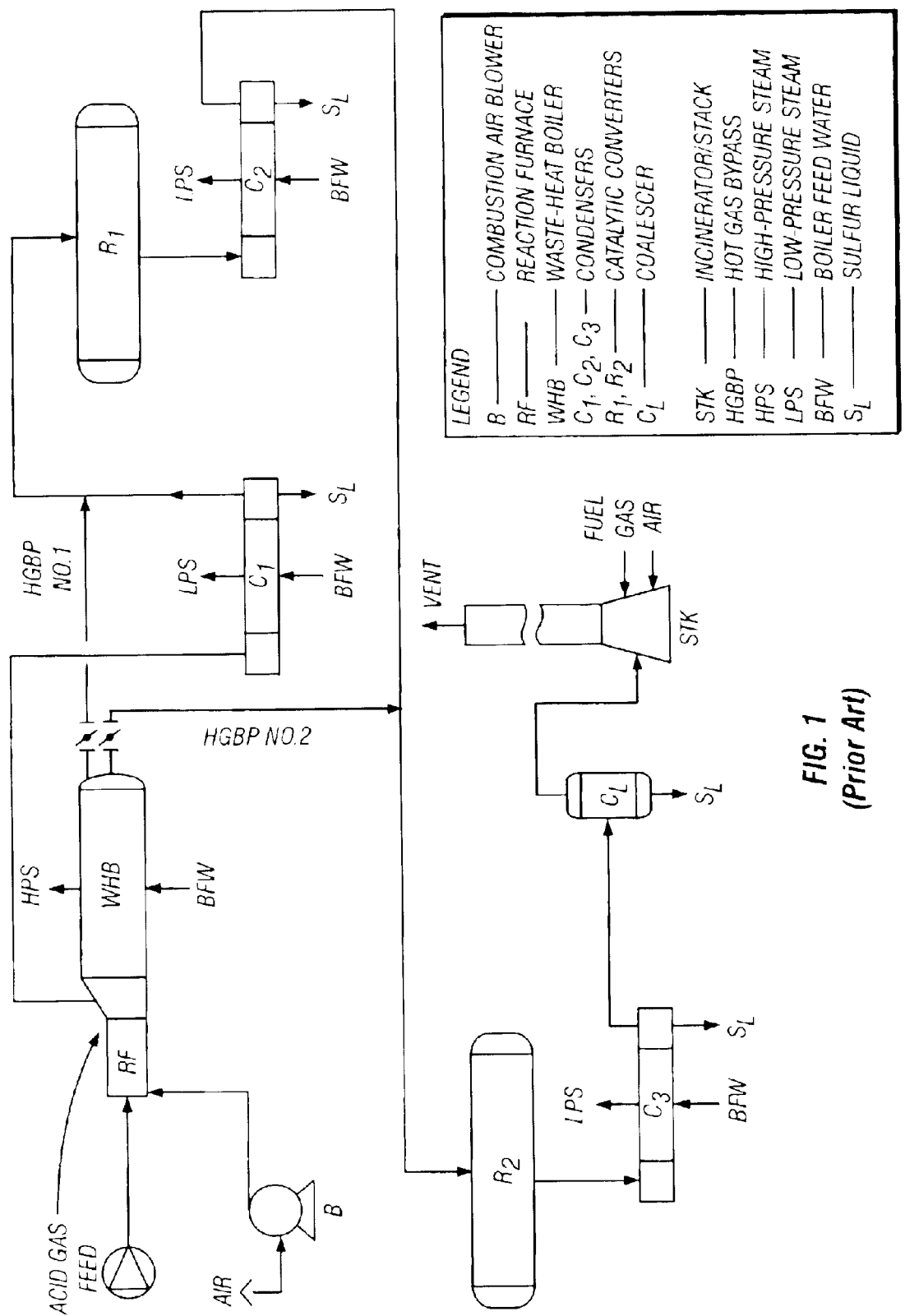
FIG. 1 is a flow diagram showing the components of a conventional prior art Claus plant.
Figure 2:
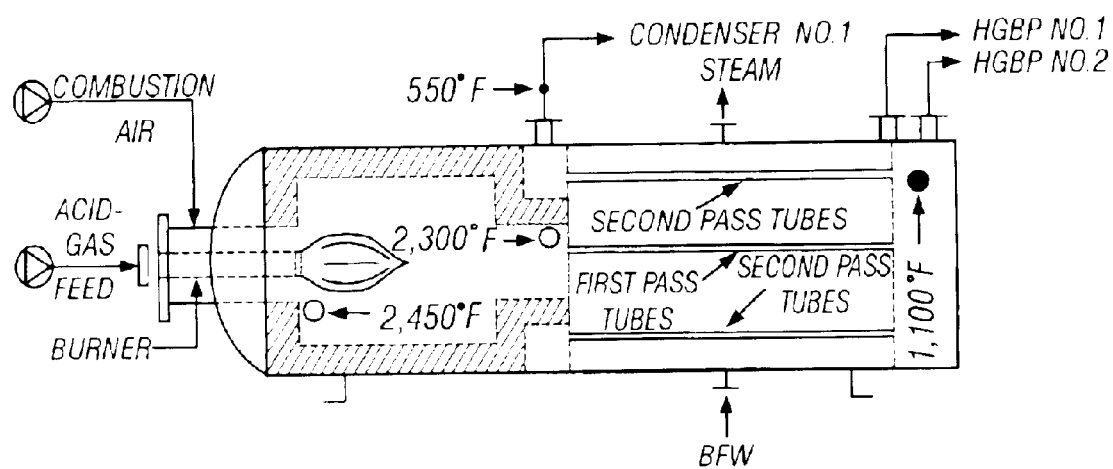
FIG. 2 is an enlarged cross-sectional view of the reaction furnace and waste heat boiler of a conventional prior art Claus sulfur recovery system.

FIG. 1 shows a typical prior art Claus plant flow diagram, employing a once-through flow scheme. In this figure, B indicates a combustion air blower; RF indicates a reaction furnace; WHB is a waste-heat boiler; $C_1$, $C_2$ and $C_3$ are condensers; $R_1$ and $R_2$ are catalytic converters; $C_L$ is a coalescer; STK is an incinerator or stack; HGBP is a hot gas bypass; HPS is high pressure steam; LPS is low-pressure steam; BFW is boiler feed water and SL is liquid sulfur. It uses two hot-gas bypass (HGBP) reheats, and three sulfur condensers. Inside the reaction furnace, unburned $H_2S$ in the acid gas reacts with the $SO_2$ formed to yield elemental sulfur vapor. The Claus thermal reaction furnace and waste heat boiler of FIG. 1 are shown in more detail in FIG. 2.

Short Contact Time Sulfur Recovery System

Figure 3A:
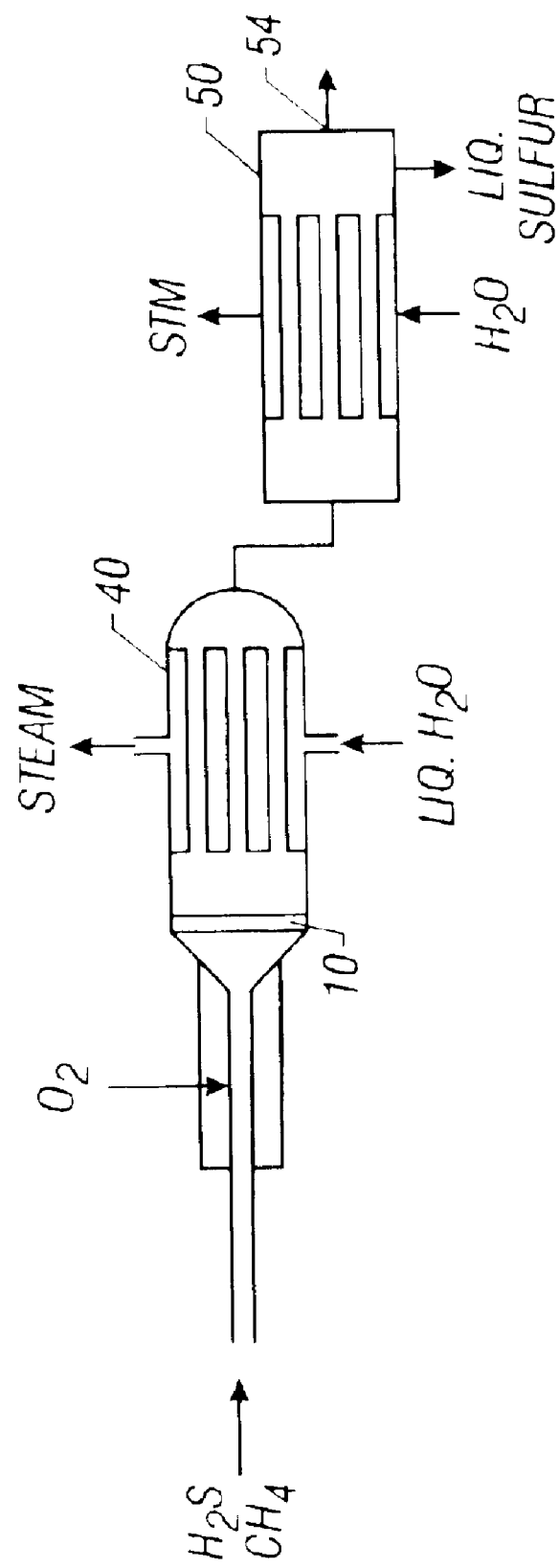
FIG. 3A is a flow diagram showing one embodiment of the sulfur recovery system of the present invention.
Figure 3B:
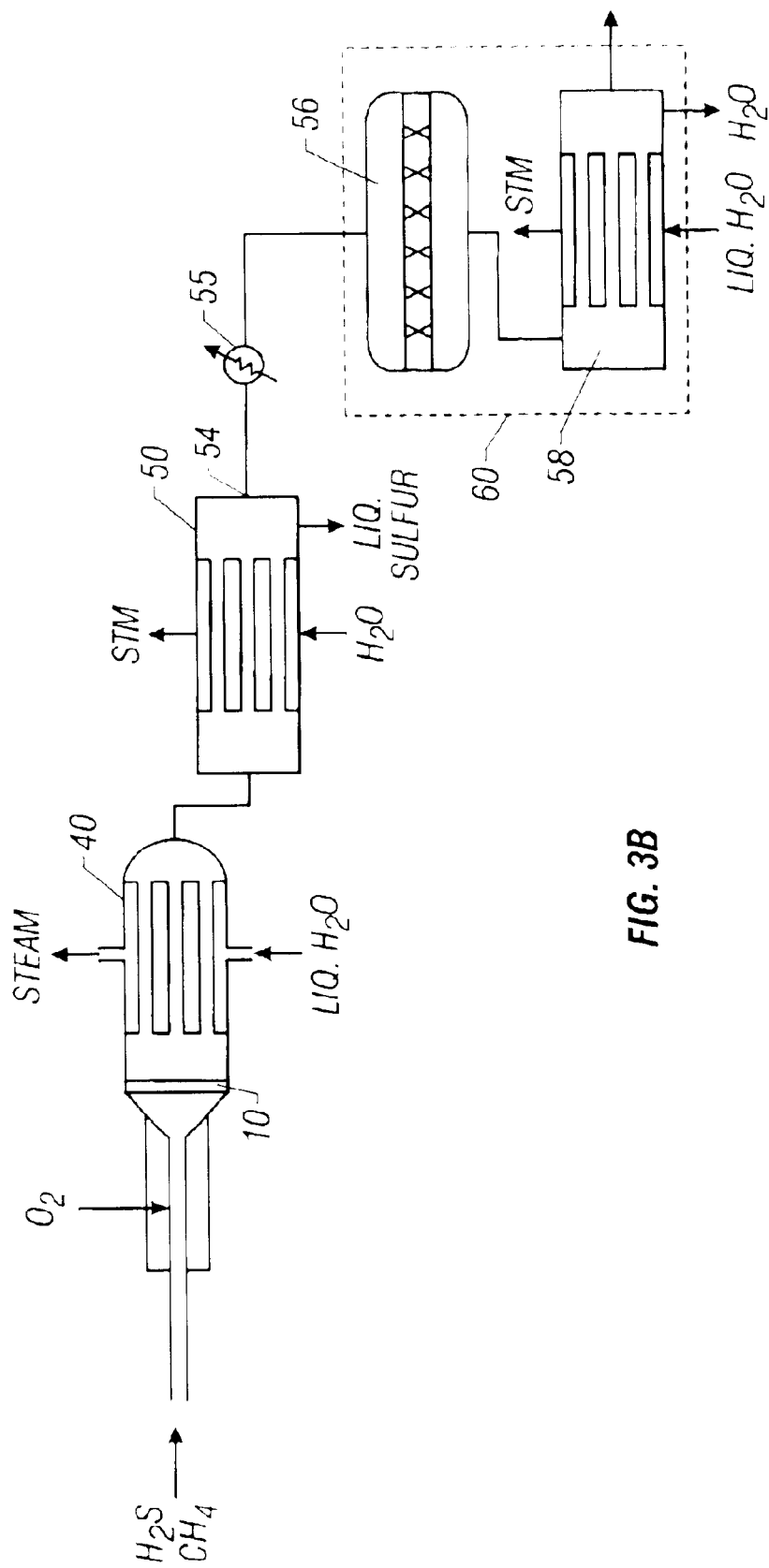
FIG. 3B is a flow diagram showing another embodiment of the sulfur recovery system of the present invention.

Preferred sulfur recovery systems according to the present invention, schematically shown in FIGS. 3A–B, employ fewer steps and less equipment than a typical Claus sulfur recovery system. The catalytic partial oxidization of $H_2S$ to elemental sulfur and water is carried out in a very fast contact (i.e., millisecond range)/fast quench (i.e., less than one second) reactor assembly (the $H_2S$ partial oxidation process). The present system utilizes a short contact time reactor similar to that described by L. D. Schmidt and his colleagues at the University of Minnesota in U.S. Pat. No. 5,648,582 and in *J. Catalysis* 138, 267–282 (1992) for use in the production of synthesis gas by direct oxidation of methane over a catalyst such as platinum or rhodium. The disclosures of those references are incorporated herein by reference.

A basic sulfur recovery system, shown in FIG. 3A, includes reactor 10, a heat exchanger or waste heat boiler 40 and a condenser 50. Depending on the purity of the $H_2S$ stream and the particular contaminating gases included in the feedstock, the system may also include a heater 55, one or more tail gas clean up units 60 and a condenser 58, as shown in FIG. 3B.

Figure 4:
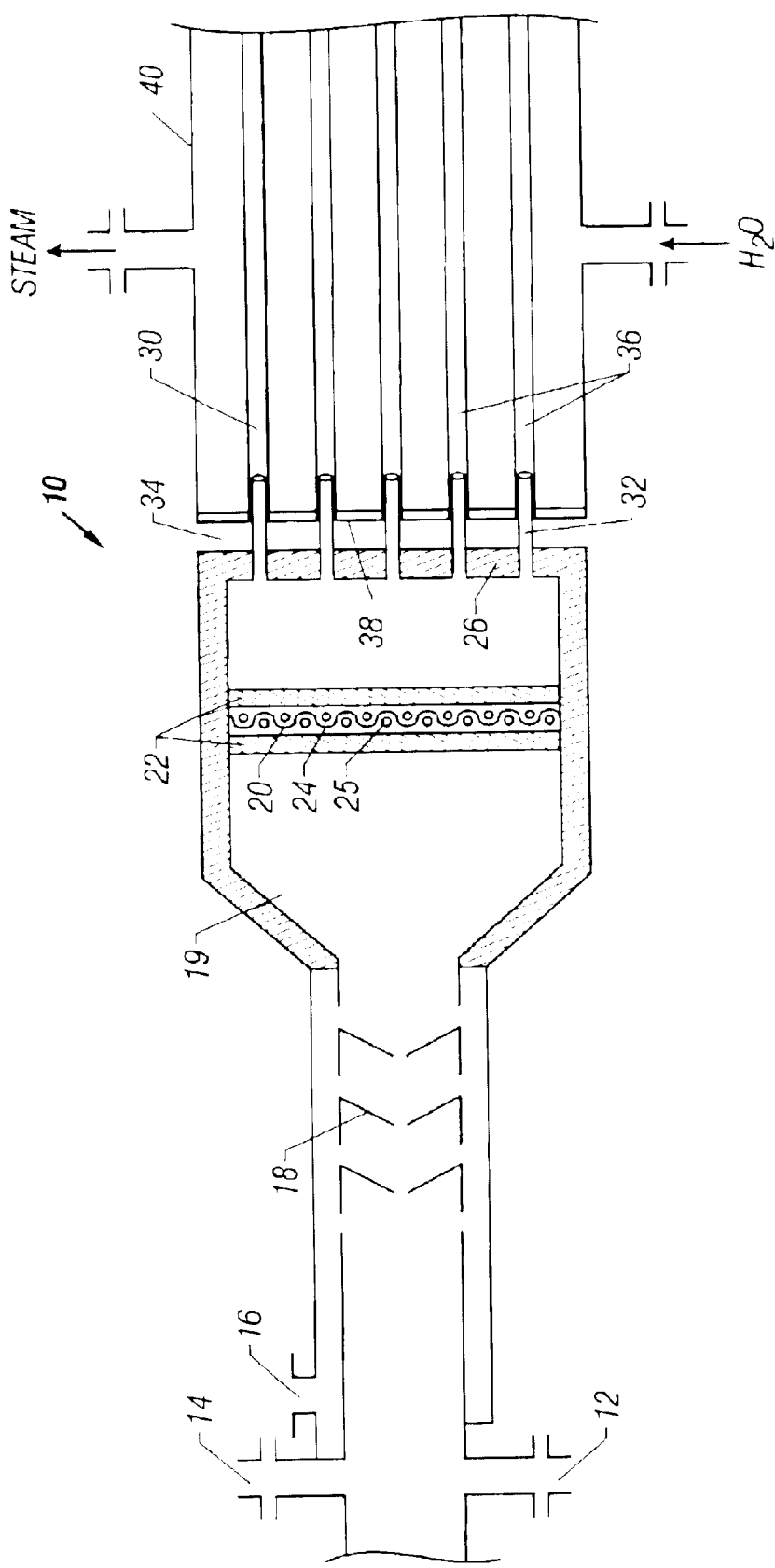
FIG. 4 is an enlarged cross-sectional view of a millisecond contact time reactor according to a preferred embodiment of the process of the invention.

FIG. 4 is a cross-sectional view showing a preferred configuration of the interior of a millisecond contact time reactor 10, designed for sulfur recovery by the direct oxidation of $H_2S$. Very generally described, the reactor is essentially a tube made of materials capable of withstanding the temperatures generated by the exothermic SCPOX reaction set out in equation (3). Inside the tube one or more very thin catalyst device 25, such as a wire gauze, a foam monolith or a particle bed 24 are placed in the cross section of the tube. This thin catalyst bed, together with operation of the process at very high space velocity, ensures that the catalyst is in contact with the reactants for very short times, the partial oxidation reaction generally going to completion in 1 millisecond. It is preferred to place a radiation shield or barrier 22 in front of the catalyst bed to prevent pre-igniting the reactants before entering the reaction zone. Radiation barrier 22 is preferably a porous ceramic or other refractory material that is suited to withstand the operating temperatures and pressures of the process, and to provide sufficient thermal insulation to the cooler reactant gas mixture upstream from the hot reaction zone. Such refractory materials are well known and described, for example, in U.S. Pat. No. 4,038,036 (Beavon), the disclosure of which is incorporated herein by reference.

Referring still to FIG. 4, reactor 10 includes $H_2S$-containing gas feed injection inlets 12, 14, $O_2$-containing gas feed inlet 16, mixing zone 19, reaction zone 20 and a portion of cooling zone 30. In mixing zone 19 is static mixer 18, which may be a group of vanes projecting from the walls of a concentric perforated pipe 17. Mixing zone 19 and reaction zone 20 are preferably formed from or lined with a suitable refractory material 26. Reaction zone 20 preferably also includes a similar thermal radiation barrier 22 positioned immediately upstream of catalytic device 24 to provide some measure of thermal insulation to cooling zone 30.

In alternative reactor designs, the feed gas inlets may be configured differently to suit a particular need. For example, inlet 12 or 14 could be omitted such that there is only an $O_2$ inlet and a single channel $H_2S$-containing gas stream inlet. Referring still to FIG. 4, catalyst device 25 is preferably in the form of one or more layers of wire gauze, a porous ceramic monolith, or a bed of discrete or divided structures 24, which is held between two porous refractory disks (radiation barriers 22). The catalyst device is preferably configured so that, as the stream of $H_2S$ and $O_2$ passes over the catalyst, only a first fraction of each portion of the gas mixture contacts the catalytically active surfaces of the catalyst device, while the balance of that portion of gas mixture serves to quickly cool the first fraction and prevent the oxidation reaction from proceeding too far.

Cooling zone 30 includes ceramic ferrules 32 embedded in refractory 26 and a tube sheet 34 containing a plurality of thermally conductive tubes 36. The tube sheet 34 is the divider between the process gas and the boiling water at the junction (joints 38) of reactor 10 with waste heat boiler 40. The tubes 36 and tube sheet 34 are preferably made of carbon steel. The tube sheet 34 forces the process gas to go through the inside of the tubes 36. Boiling water surrounds the outside of thermally conductive tubes 36. Since the carbon steel of the tubes and tube sheet cannot withstand the temperatures of the process gas, temperature protection for the metal is necessary in both. In tubes 36 and for most of the tube sheet 34, this protection is afforded by the boiling water. Since the boiling water remains at a constant temperature, and since the metal conducts heat so readily, the tubes and most of the tube sheet attain temperatures only slightly above the temperatures of the boiling water (i.e., about 100° C.). This is not the case for the part of tube sheet where the tubes connect at joints 38. Without thermal protection, joints 38 and the first part of the tube would see temperatures far exceeding the safe operating limits for the metal. The refractory covering 26 and ceramic ferrules (tube inserts) 32 provide insulation for these relatively unprotected areas of metal. Thus, only metal surfaces that are adequately exposed to the boiling water will encounter the hottest gases. Tubes 36 extend into waste heat boiler 40, which is preferably similar to a conventional boiler. As shown in FIG. 3A, tubes 36 terminate in a common reservoir at the opposite end of waste heat boiler 40, which is connected to condenser 50. Condenser 50 is similar to a conventional sulfur condenser and receives the partially cooled reacted gases from boiler 40 and terminates with a liquid sulfur outlet and a desulfurized waste gas outlet 54. If the desulfurized gas emerging from outlet 54 contains an unacceptable level of residual $H_2S$, the system may also include a heater 55 and one or more conventional tail gas converter units 60. Tail gas converter unit 60 includes a tail gas treatment such as sulfur absorbing material 56 and a second sulfur condenser 58 (illustrated in FIG. 3B) for further purifying the waste gas stream before it is vented into the atmosphere.

$H_2$ Partial Oxidation Catalysts

Catalysts or catalyst devices that are active for catalyzing the direct partial oxidation of $H_2S$ to elemental sulfur according to Reaction (4) are preferably in the form of one or more layers of wire gauze, one or more porous ceramic monolith, a bed containing or one or more layers of discrete or divided structures. The catalyst device may be formed entirely of catalytic material, or it may comprise one or more catalytic components supported on a non-catalytic refractory support. Some suitable catalytic components that can be included in the metal of a gauze, or incorporated at its surface, or supported on a non-catalytic wire gauze, or other suitable refractory monolith or divided support, include platinum, rhodium, ruthenium, iridium, nickel, palladium, iron, cobalt, rhenium and rubidium, or a combination of any of those metals. Platinum or rhodium, or especially a platinum-rhodium alloy, are preferred metals. A lanthanide oxide promoter is included in some of the more preferred catalyst compositions. Other catalytically active metals that may be included in the catalyst are vanadium, bismuth and antimony. Non limiting examples of catalytic metals deposited on refractory oxide supports include $Pd-La_2O_3$, $Pt/ZrO_2$ and $Pt/Al_2O_3$.

Metal Gauzes. One type of catalyst is in the form of one or more layers of substantially planar, flexible woven metal-containing or metal-coated screen or gauze having about 20–120 mesh and diameter compatible with the inner diameter of the reactor. Suitable metals that may be formed into a gauze or deposited onto a non-catalytic gauze support include platinum, rhodium, ruthenium, iridium, nickel, palladium, iron, cobalt, rhenium and rubidium, or a mixture of any of those metals. Some of the more preferred gauze-type catalysts are made of about 87–93% by weight (wt %) Pt and about 7–13 wt % Rh (wt % based on total weight of the catalyst device). Alternative catalyst structures or devices may be in the form of one or more perforated disks, honeycomb-like structures, etched foils or any other suitably active structure that provides the desired gas flow rate to effect the desired partial oxidation.

Rh on a Ln-modified Refractory Support. Another type of catalyst that is active for catalyzing the direct partial oxidation of $H_2S$ to elemental sulfur comprises about 0.005 to 25 wt % Rh, preferably 0.05 to 25 wt % Rh, and about 0.005 to 25 wt % of a lanthanide element (i.e., La, Ce, Pr, Nd, Pm, Sm, Eu, Gd, Tb, Dy, Ho, Er, Tm, Yb and Lu), preferably samarium, ytterbium or praseodymium, in the form of the metal and/or metal oxide coating a refractory monolith or a plurality of distinct or discrete structures or particulates. An especially preferred Rh—Ln catalyst contains about 0.5–10 wt % Rh and about 0.5–10 wt % Sm on a refractory support, especially where the ratio of rhodium to Sm is in the range of about 0.5–2. For example, an active $H_2S$ partial oxidation catalyst is prepared by depositing Rh (e.g., 4–6 wt. %) onto a layer of Sm (e.g., 5 wt. %) that coats a partially stabilized (MgO) zirconia ("PSZ") monolith, which contains about 45–80 pores per linear inch. Weight percents (wt %) refer to the amount of metal component relative to the total weight of the catalyst, including the support, if any. Suitable PSZ monoliths are commercially available from Vesuvius Hi-Tech Ceramics Inc., Alfred Station, N.Y. Other monolith support structures or catalyst configurations include a disk with multiple perforations formed therethrough, a honeycomb-like structure, an etched foil and any other structure that provides the desired amount of transparency to permit the 200 millisecond or less contact time to effect the desired $H_2S$ partial oxidation reaction. A discussion of catalyst structure and composition considerations for short contact time CPOX reactors can be found in U.S. Pat. No. 5,654,491 (Goetsch et al.), which is hereby incorporated herein by reference. As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value. The terms "discrete" or "divided" structures or units refer to catalyst devices or supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than ten millimeters, preferably less than five millimeters. The term "monolith" refers to any singular piece of material of continuous manufacture such as solid pieces of metal or metal oxide or foam materials or honeycomb structures. Two or more such catalyst monoliths may be stacked in the catalyst zone of the reactor if desired. In any case, the catalyst device, system or bed has sufficient porosity, or sufficiently low resistance to gas flow, to permit a stream of said reactant gas mixture to pass over the catalyst at a gas hourly space velocity (GHSV) of at least about 20,000 $hr^{-1}$, preferably at least 100,000 $hr^{-1}$, when the reactor is operated to recover elemental sulfur from an $H_2S$ containing gas.

Pt—Rh Alloy. While many of the above-described catalyst compositions have demonstrated good activity for catalyzing the partial oxidation of $H_2S$, and are satisfactory for a number of SCPOX applications, some metals, such as Rh, suffer from deactivation with extended on stream use due to the formation of sulfur deposits and/or metal sulfide formation that removes the active catalytic form. The surprising discovery was made that this problem is greatly improved or solved completely by combining platinum with rhodium in the catalyst.

Pt—Rh Alloy on Ln-modified Refractory Support. An especially good catalyst that is highly stable and active for catalyzing the direct partial oxidation of high concentrations of $H_2S$ in a gas stream to elemental sulfur and water contains both platinum and rhodium supported on a samarium-modified refractory support such as the above-described supports and materials. A highly preferred catalyst is prepared by depositing about 0.1%–6 wt % Pt onto about 3–6 wt % Rh, which was previously deposited onto an approximately 3–5 wt % lanthanide oxide, preferably samarium oxide, coated refractory support (wt % based on total weight of the supported catalyst). A preferred support is alumina granules, more preferably alpha-alumina. In the present investigations, the surprising synergy between the Pt and Rh components enhanced catalyst stability under SCPOX reaction conditions, and when further combined with a lanthanide or lanthanide oxide promoter provides an even better catalyst for syngas production. Catalyst stability refers to resistant to (a) deactivation due to carbon or sulfur deposition, (b) chemical reaction between sulfur and the catalytic components and (c) volatilization of precious metal at reaction conditions. The stability is typically shown by a consistent and reproducible catalytic performance (e.g., S yield with $H_2S$ feed or syngas yield with light hydrocarbon feed).

The above-described Pt-Rh based catalysts are preferably in the form of either a wire gauze, a foam monolith, or in the form of a catalytically active material dispersed or deposited on a refractory support containing zirconia, alumina, cordierite, titania, mullite, zirconia-stabilized alumina, MgO stabilized zirconia, MgO stabilized alumina, niobia or a mixture of any of those materials, or another suitable refractory material. For example, the catalyst can be structured as, or supported on, a refractory oxide "honeycomb" straight channel extrudate or monolith, made of cordierite or mullite, or other configuration having longitudinal channels or passageways permitting high space velocities with a minimal pressure drop. Such configurations are known in the art and described, for example, in *Structured Catalysts and Reactors*, A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst"), which is hereby incorporated herein by reference.

A more preferred catalyst geometry comprises granules prepared by impregnating or washcoating the catalytic components, or their precursors, onto lanthanide coated refractory granules, calcining and reducing the catalyst, using techniques that are well known in the art. A catalyst bed for a the $H_2S$ catalytic partial oxidation process may comprise a quantity of such impregnated or coated granules, or other forms of support such as beads, pills, pellets, cylinders, trilobes, extrudates, spheres, other rounded shapes or other manufactured configurations, or irregularly shaped particles. The supports preferably comprise a refractory material such as zirconia, alumina, cordierite, titania, mullite, zirconia-stabilized alumina, MgO stabilized zirconia, MgO stabilized alumina, niobia or a mixture of any of those materials, or another suitable refractory material. Alumina is preferably in the form of alpha-alumina, however the other forms of alumina have also demonstrated satisfactory performance.

The apparent synergy between Pt and Rh in the catalyst that enhances catalyst stability under SCPOX reaction conditions was also observed under CPOX reaction conditions. The Pt—Rh/Ln catalyst also has superior activity for converting an H₂S stream containing a light hydrocarbon, such as methane, to elemental sulfur and synthesis gas, by way of concurrent CPOX and SCPOX reactions carried out over the same catalyst in a single reaction zone, operating the reactor at hydrocarbon, H₂S and O₂ concentrations and process conditions that favor the formation of both sulfur, CO and H₂, as described in co-owned U.S. Pat. No. 6,579,510 and U.S. patent application Ser. No. 09/625,710, each of which is hereby incorporated herein by reference.

Carbided Pt/Rh on a Refractory Support. Another unexpected discovery was that the gradual deactivation of rhodium, and others among the above-named SCPOX catalysts, was also improved by carbiding the catalyst under gaseous hydrocarbon flow before, after or during the H₂S flow, under CPOX-promoting reaction conditions. An especially active catalyst that provides improved performance for converting H₂S to sulfur by direct partial oxidation (the H₂S partial oxidation process) is prepared by carbiding a Pt—Rh catalyst before exposing the catalyst to H₂S.

$O_2$-containing gas to deter or minimize coking of the catalyst during treatment. The amount of oxygen preferably does not exceed the stoichiometric amount necessary to support catalytic partial oxidation of the hydrocarbon (CPOX reaction), i.e., a carbon:oxygen molar ratio of 2:1. If the catalytic components are also active for catalyzing the CPOX reaction, production of synthesis gas (CO and $H_2$) may commence during the pre-treatment step upon reaching a temperature sufficient to initiate the reaction. Without wishing to be bound by any particular theory, it is believed that, in the case of a Pt—Rh alloy catalyst, the formation of Rh and/or Pt carbide in which at least a substantial portion of the catalytic metal component exists in the same phase with carbon (e.g., $RhC_x$, or $PtC_x$, which resists the formation of metal sulfide(s) that can deactivate the catalyst by covering the active centers. Thus, the stability and life of the catalyst on H₂S stream is increased or enhanced by the carbiding treatment.

TABLE 1

Catalyst Performance for H₂S Catalytic Partial Oxidation Process

| | Catalyst composition | H₂S flow (ml/min) | Air flow (ml/min) | N₂ flow (ml/min) | H₂S conversion (%) | S yield (%) | SO₂ yield (%) | Cause of deactivation |
|---|---|---|---|---|---|---|---|---|
| Without carbiding | 3.9% Rh, 5.1% Sm on 80-ppi alpha-alumina foam (1 gram total weight) | 633 892 1140 1640 | 1519 2141 2736 3936 | 900 900 900 1000 | 75.7 78.4 79.7 79.0 | 63.9 65.8 65.9 62.6 | 11.8 12.7 13.8 16.4 | Sulfur formation on the catalyst (shown by SEM analysis) |
| With carbiding (Propane) | 4.2% Rh, 5.2% Sm on 80-ppi alpha-alumina foam (1 gram total weight) | 1195 2195 | 4768 5265 | 0 0 | 82.2 82.7 | 69.4 69.7 | 12.9 13.0 | No deactivation for the run duration (6 hours) |
| With carbiding (Methane) | 0.5% Pt, 5% Rh, 5% Sm on 1/16" alpha/gamma-alumina extrudates (2 grams total weight) | 761 1520 | 1755 3498 | 0 0 | 82.4 82.6 | 72.4 71.3 | 10.0 11.3 | No deactivation for the run duration(10 hours) |

Note: S and SO₂ yields are calculated as the product of H₂S conversion and S or SO₂ selectivity respectively. Nitrogen addition for the non-carbided catalyst was needed to lower the catalyst temperature.

The carbiding process includes exposing the catalyst, in any of the forms described above, to light hydrocarbon (a $C_1-C_5$ hydrocarbon, preferably methane, ethane, propane or butane) under CPOX reaction conditions as described in Ser. No. 09/625,710. Preferably this hydrocarbon pre-treatment procedure (referred to herein as "carbiding") is carried out with the catalyst in place in the short contact time reactor. The carbiding treatment includes heating the catalyst to at least 700° C. or up to about 1,500° C., preferably in the range of 850° C.–1,300° C., in the presence of the light hydrocarbon. Upon getting the catalyst up to CPOX operating temperature, the flow of hydrocarbon is stopped and the flow of H₂S containing gas is begun for sulfur removal and recovery under SCPOX operating conditions. It is preferable to perform the carbiding treatment before exposing the catalyst to H₂S or other sulfur compound while the catalyst is at a temperature at which it can chemically react with sulfur or at which sulfur can condense on its active sites. In the carbiding treatment, it is preferable to mix the hydrocarbon with a small amount of oxygen or Comparing the performance of the catalysts shown in Table 1, it can be seen that after carbiding a representative monolith supported Rh/Sm catalyst, superior S yield and catalyst stability was obtained despite increasing the flow rates by 100–200%. Without wishing to be bound by any particular theory, it is believed that the formation of metal carbide prevented the formation of sulfur or sulfide species on the catalyst. This, in turn, kept the active components from getting deactivated, and improved the partial oxidation of H₂S to elemental S. Combining Pt with Rh on Sm coated extrudates provided comparable conversion and selectivity and provided even longer life on stream without sulfur deactivation or coking.

Process for Cleaning Up a H₂S-Containing Waste Gas

Referring again to FIG. 3A, in one illustrative mode of operation the above-described apparatus is set up at a refinery to receive a waste gas stream that contains a level of H₂S that is too great to be safely released into the atmosphere. The H₂S-containing stream may contain more than 1–3% H₂S, more than 15% H₂S, or can even consist of 100% H₂S. The H₂S-containing gas is fed into mixing zone 19 via feed injection inlet 12 and/or 14. Air, pure oxygen, or an air/oxygen mix is fed into the mixing zone via inlet 16. It will be understood that the feed injection openings can be configured differently from the configuration shown without affecting the principles or operation of the present system.

As the feed gases from feed injection inlets 12, 14, 16 flow into mixing zone 19 by way of perforated pipe 17, toward reaction zone 20, the gases are subjected to thorough mixing by static mixer 18. During mixing, they are shielded by radiation barrier 22 from heat that is generated downstream in the process in reaction zone 20. Preferably the temperature of the reactant gas mixture is increased up to about 200° C. to facilitate initiation of the reaction. The mixing of the gases must be very thorough to prevent combustion reactions from taking place or predominating in the reaction zone to form $SO_2$. Also, the contact time between the oxygen and $H_2S$ is minimized to prevent having a stagnant explosive mixture form in the reactor. Minimum contact time between the $O_2$ and $H_2S$ is facilitated by placing inert filler in any void spaces in the piping upstream of the catalytic section or reaction zone.

The contact time of the feed gas stream with the catalytic device 25 is less than about 200 milliseconds, more preferably less than 50 milliseconds, and more preferably less than 20 milliseconds. When referring to a wire gauze catalyst, the contact time may be calculated as the wire diameter divided by the feed gas stream velocity at inlet conditions (i.e., temperature and pressure at the inlet to the reactor). When employing a catalyst monolith or packed bed of divided catalyst, the surface area, depth of the catalyst bed, and gas flow rate (space velocity) are preferably managed to ensure the desired short contact time (i.e., less that 200 milliseconds). It is well known that contact time is inversely proportional to the "space velocity," as that term is customarily used in chemical process descriptions, and is typically expressed as volumetric gas hourly space velocity in units of $hr^{-1}$. Preferably the $H_2S$ partial oxidation process is carried out at superatmospheric pressure (i.e., greater than 1 atmosphere, more preferably >2 atmospheres), and the gas hourly space velocity is at least 20,000 $hr^{-1}$, preferably at least 100,000 $hr^{-1}$.

After the rapidly moving feed gases pass barrier 22 they flow past catalyst bed 24 and become instantaneously heated to an oxidation temperature in the range of 700° C.–1,500° C., preferably in the range of 850° C.–1,300° C. Typically, the catalyst bed 24 is heated as a result of the exothermic chemical reaction occurring at its surface. In many cases it is helpful to heat the catalyst bed 24 with external means at least at the start of the process, so as to initiate the exothermic reactions on the catalyst. This initial heating can be accomplished in any suitable manner. Once the system is running, it is preferably run adiabatically (i.e., without the loss of heat aside from convective losses in the exiting gas) and autothermally. The rapid heating of the reactant gas mixture as a result of contact with the hot catalyst promotes fast reaction rates. The catalyzed reaction goes quickly by the direct oxidization of the $H_2S$ to form sulfur and water according to the reaction:

$$H_2S + \tfrac{1}{2}O_2 \rightarrow 1/xS_x + H_2O \qquad (3)$$

where x=2, 6 or 8 (SCPOX reaction). The most likely value for x is 2 at the preferred temperatures and pressures of the presently disclosed process. If the catalyst possesses at least some activity for catalyzing the reaction, small amounts of hydrocarbon (e.g., up to about 1–5% by volume in many natural gas effluents), will likely be partially oxidized at the same time to CO and $H_2$ under the SCPOX reaction conditions.

Maintaining the preferred <200 millisecond range dwell time of the reactant gas mixture on the catalyst produces a favorable balance between temperature elevation due to the exothermic partial oxidation reaction and the convective removal of heat from the reactor by the rapidly moving product gas stream. Thus, sufficient heat is generated to maintain the catalyst at approximately 700° C.–1,500° C., preferably 850° C.–1,300° C.

From reaction zone 20, the reacted gases enter a cooling zone 30, where, in cooperation with waste heat or fire tube boiler 40, the reacted or product gases are cooled in the thermally conductive tubes 30 to below 425° C. and preferably to below about 340° C., but above the dew point of sulfur. It is preferred that heat removed from the partially oxidized gases is recaptured by boiling the water surrounding tubes 36 to evolve steam, as illustrated in FIGS. 3A–B and 4, or by some other similar technique. The rapid cooling that occurs in the boiler drops the temperature of the reacted gases to below about 425° C. and thus ceases the oxidation reaction. The cooled water and sulfur vapor products, plus any incidental gases or combustion products, flow from boiler 40 into condenser 50, where they are cooled further until the dew point of elemental sulfur is reached. High levels of conversion and the lack of $SO_2$ formation obtained with a single pass through the reactor will usually make it unnecessary, however, to proceed to Claus process type catalytic reactor stages in order to achieve a good level of desulfurization of the feed. Liquid sulfur forms in sulfur condenser 50 and may be removed from the condenser, as shown in FIGS. 3A–B. Under the preferred optimal operating conditions, and when only a minor amount of other gas or gases such as light hydrocarbons are present in the $H_2S$ rich gas feed, the desulfurized gas emerging from the condenser 50 may be safely vented into the atmosphere without constituting an environmental burden. In some situations, however, such as where the $H_2S$-containing feedstock contains an appreciable amount of contaminating gases, it may be desirable to remove even very low levels of sulfurous or other components before the residual gases are vented into the atmosphere. In such case, the gas leaving sulfur condenser 50 may be reheated by heater 55 and sent to tail gas treatment unit 60, as shown in FIG. 3B, or a series of tail gas treatment units, if necessary for a particular application. Residual sulfur-containing components are preferably absorbed by sulfur absorbing material 56 such as chelated iron, iron oxide, zinc oxide, sodium nitrite, or a basic aqueous solution (e.g. caustic or an alkanolamine), and the desulfurized gas emerging from sulfur absorber 56 is sent to condenser 58 where water is condensed and waste gas is vented.

By reducing the amount of equipment necessary to obtain a high level of sulfur recovery from a feed gas, the total pressure drop through the sulfur plant can be greatly reduced. Since Claus plants are normally limited by the amount of pressure drop due to the low pressure operation, the present system advantageously allows for capacity expansion by the user without having to resort to techniques such as oxygen enrichment. This new short contact time sulfur recovery process and simplified sulfur process plants are suitable for use in most refinery or gas plant processes such as hydrotreaters, cokers and fluid catalytic crackers where $H_2S$-containing waste gases are typically produced and desulfurization is needed before the waste gas can be safely vented into the atmosphere.

As an alternative to the foregoing procedure, if the $H_2S$-rich waste gas contains an appreciable amount of methane or other light hydrocarbon that is desired to be salvaged for use in another process, this included gas, substantially free of or depleted in H$_2$S can be recovered and then routed to a hydrocarbon utilization process after emerging from condenser 50. This is preferably accomplished by restricting the amount of O$_2$ in the feed, by using a catalyst that is more favorable for catalyzing the SCPOX reaction than the catalytic partial oxidation of the hydrocarbon (CPOX), and other reaction conditions, as described in co-owned, concurrently filed U.S. patent application Ser. No. 10/024,679 entitled "Short Contact Time Catalytic Partial Oxidation Process for Recovering Sulfur from an H$_2$S-containing Gas Stream," the disclosure of which is hereby incorporated herein by reference. As a result, there is minimal direct stack emission from the sulfur recovery unit into the air surrounding the plant.

Alternatively, if it is desired that the salvaged methane or other light hydrocarbon be used for the production of synthesis gas, it may be preferable to instead convert the H$_2$S-containing hydrocarbon stream directly to elemental sulfur and synthesis gas, by way of concurrent CPOX and SCPOX reactions carried out in a single reaction zone over a catalyst that is active for promoting both types of partial oxidation reactions. In that case, the reactor is operated at hydrocarbon, H$_2$S and O$_2$ concentrations and process conditions that favor the formation of both sulfur, CO and H$_2$, as described in co-owned, U.S. Pat. No. 6,579,510 and U.S. patent application Ser. No. 09/625,710, each of which is hereby incorporated herein by reference.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. Use of the term "optionally" with respect to any element of a claim is intended to mean that the subject element is required, or alternatively, is not required. Both alternatives are intended to be within the scope of the claim. The discussion of a reference in the Description of Related Art is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

What is claimed is:

1. A waste gas desulfurization process comprising:
   providing a H$_2$S-containing waste gas stream;
   providing a O$_2$-containing stream;
   in a millisecond contact time reactor having a gas mixing zone, a reaction zone, and a cooling zone, mixing together said H$_2$S-containing gas stream and said O$_2$-containing gas stream in said mixing zone to form a reactant gas mixture, said reaction zone containing a catalyst device having activity for catalyzing the partial oxidation of H$_2$S to elemental sulfur and water;
   maintaining the temperature of said reaction zone above 300° C.;
   passing said reactant gas mixture over said catalyst device such that the contact time between said catalyst device and a portion of said reactant gas mixture that contacts said catalyst device is sufficiently brief to allow the reaction H$_2$S+½O$_2$→1/x S$_x$+H$_2$O (x=2, 6 or 8) to occur, and a product gas stream is formed comprising gaseous elemental sulfur and water;
   passing said product gas stream into said cooling zone and cooling said product stream to a temperature above the dewpoint of sulfur, to provide a partially cooled product stream;
   passing said partially cooled product stream into a sulfur condenser and further cooling said partially cooled product stream to the dewpoint temperature of elemental sulfur, or lower wherein at least the reaction zone of said reactor is capable of withstanding temperatures of at least 1500° C., said H$_2$S-containing gas stream and said O$_2$-containing gas stream are combined in said mixing zone to form a reactant gas mixture having a molar ratio of H$_2$S to O$_2$ of about 2:1 or less and the temperature of said reaction zone is 700–1,500° C.

2. A waste gas desulfurization process comprising:
   providing a H$_2$S-containing waste gas stream;
   providing a O$_2$-containing stream;
   in a millisecond contact time reactor having a gas mixing zone, a reaction zone, and a cooling zone, mixing together said H$_2$S-containing gas stream and said O$_2$-containing gas stream in said mixing zone to form a reactant gas mixture, said reaction zone containing a catalyst device having activity for catalyzing the partial oxidation of H$_2$S to elemental sulfur and water;
   maintaining the temperature of said reaction zone above 300° C.;
   passing said reactant gas mixture over said catalyst device such that the contact time between said catalyst device and a portion of said reactant gas mixture that contacts said catalyst device is sufficiently brief to allow the reaction H$_2$S+½O$_2$→1/x S$_x$+H$_2$O (x=2, 6 or 8) to occur, and a product gas stream is formed comprising gaseous elemental sulfur and water;
   passing said product gas stream into said cooling zone and cooling said product stream to a temperature above the dewpoint of sulfur, to provide a partially cooled product stream;
   passing said partially cooled product stream into a sulfur condenser and further cooling said partially cooled product stream to the dewpoint temperature of elemental sulfur, or lower, wherein said contact time is no more than about 200 milliseconds.

3. The process of claim 2 wherein said catalyst device comprises at least one metal chosen from the group consisting of platinum, rhodium, ruthenium, iridium, nickel, palladium, iron, cobalt, rhenium, rubidium, vanadium, bismuth and antimony.

4. The process of claim 3 wherein said catalyst device comprises at least one metal chosen from the group consisting of platinum, rhodium, ruthenium, iridium, nickel, palladium, iron, cobalt, rhenium and rubidium.

5. The process of claim 4 wherein in said catalyst device comprises at least one metal chosen from the group consisting of platinum, rhodium, ruthenium, nickel, palladium and iridium.

6. The process of claim 5 wherein said catalyst device comprises platinum, rhodium or a mixture thereof.

7. The process of claim 3 wherein said catalyst device comprises at least one lanthanide element (Ln) chosen from the group consisting of La, Ce, Pr, Nd, Pm, Sm, Eu, Gd, Tb, Dy, Ho, Er, Tm, Yb and Lu.

8. The process of claim 7 wherein at least one said lanthanide element is samarium, ytterbium or praseodymium.

9. The process of 3 wherein said catalyst device comprises vanadium, bismuth or antimony.

10. The process of claim 2 wherein said catalyst device comprises at least one structure chosen from the group consisting of gauzes, monoliths and a plurality of divided units.

11. The process of claim 10 wherein said structure comprises a refractory support.

12. The process of claim 11 wherein said catalyst refractory support comprises zirconia or alumina.

13. The process of claim 10 wherein said divided units are selected from the group consisting of particles, granules, beads, pills, pellets, cylinders, trilobes, extrudates and spheres.

14. The process of claim 2 wherein said catalyst device comprises platinum and a lanthanide metal oxide chosen from the group consisting of cerium oxide and lanthanum oxide.

15. The process of claim 14 wherein said catalyst device comprises rhodium and samarium oxide.

16. The process of claim 2 comprising preheating said $H_2S$ and/or $O_2$ stream up to about 200° C. before contacting said catalyst device.

17. The process of claim 2 comprising recovering a product comprising elemental sulfur and, optionally, venting a substantially desulfurized residual gas.

18. The process of claim 2 comprising providing a $H_2S$-containing gas containing at least about 1 vol. % $H_2S$.

19. The process of claim 2 wherein said $O_2$-containing gas is chosen from the group consisting of purified $O_2$, air, and $O_2$ enriched air.

20. The process of claim 2 comprising operating said reactor at a space velocity of at least about 20,000 $hr^{-1}$.

21. The process of claim 2 comprising operating said reactor at superatmospheric pressure.

22. The process of claim 2 wherein said contact time is less than 50 milliseconds.

23. The process of claim 2 wherein said contact time is less than 20 milliseconds.

24. A waste gas desulfurization process comprising:
providing a $H_2S$-containing waste gas stream;
providing a $O_2$-containing stream;
in a millisecond contact time reactor having a gas mixing zone, a reaction zone, and a cooling zone, mixing together said $H_2S$-containing gas stream and said $O_2$-containing gas stream in said mixing zone to form a reactant gas mixture, said reaction zone containing a catalyst device having activity for catalyzing the partial oxidation of $H_2S$ to elemental sulfur and water;
maintaining the temperature of said reaction zone between about 850° C.–1,300° C.;
passing said reactant gas mixture over said catalyst device such that the contact time between said catalyst device and a portion of said reactant gas mixture that contacts said catalyst device is sufficiently brief to allow the reaction $H_2S+\frac{1}{2}O_2 \rightarrow 1/x\, S_x + H_2O$ (x=2, 6 or 8) to occur, and a product gas stream is formed comprising gaseous elemental sulfur and water;
passing said product gas stream into said cooling zone and cooling said product stream to a temperature above the dewpoint of sulfur, to provide a partially cooled product stream;
passing said partially cooled product stream into a sulfur condenser and further cooling said partially cooled product stream to the dewpoint temperature of elemental sulfur, or lower.

25. The process of claim 24 regulating reactor inlet temperatures, regulating $H_2S$ concentration in the reactant gas mixture, and/or applying heat to said catalyst device such that the temperature of said catalyst device is maintained at a desired temperature between said 850–1,300° C.

26. The process of claim 24 further comprising maintaining autothermal reaction promoting conditions.

27. A waste gas desulfurization process comprising:
providing a $H_2S$-containing waste gas stream;
providing a $O_2$-containing stream;
in a millisecond contact time reactor having a gas mixing zone, a reaction zone, and a cooling zone, mixing together said $H_2S$-containing gas stream and said $O_2$-containing gas stream in said mixing zone to form a reactant gas mixture, said reaction zone containing a catalyst device having activity for catalyzing the partial oxidation of $H_2S$ to elemental sulfur and water;
maintaining the temperature of said reaction zone above 300° C.;
passing said reactant gas mixture over said catalyst device such that the contact time between said catalyst device and a portion of said reactant gas mixture that contacts said catalyst device is sufficiently brief to allow the reaction $H_2S+\frac{1}{2}O_2 \rightarrow 1/x\, S_x + H_2O$ (x=2, 6 or 8) to occur, and a product gas stream is formed comprising gaseous elemental sulfur and water;
passing said product gas stream into said cooling zone and cooling said product stream to a temperature above the dewpoint of sulfur, to provide a partially cooled product stream;
passing said partially cooled product stream into a sulfur condenser and further cooling said partially cooled product stream to the dewpoint temperature of elemental sulfur, or lower, wherein said catalyst device comprises at least one catalytic carbided metal.

28. The process of claim 27 wherein said carbided metal comprises platinum and rhodium.

29. The process of claim 27 wherein $H_2S$ conversion is at least about 82%, selectivity for elemental sulfur product is at least about 70% and selectivity for $SO_2$ is no more than about 10–13%.

30. A waste gas desulfurization process comprising:
providing a $H_2S$-containing waste gas stream;
providing a $O_2$-containing stream;
in a millisecond contact time reactor having a gas mixing zone, a reaction zone, and a cooling zone, mixing together said $H_2S$-containing gas stream and said $O_2$-containing gas stream in said mixing zone to form a reactant gas mixture, said reaction zone containing a catalyst device having activity for catalyzing the partial oxidation of $H_2S$ to elemental sulfur and water;
maintaining the temperature of said reaction zone above 300° C.;
passing said reactant gas mixture over said catalyst device such that the contact time between said catalyst device and a portion of said reactant gas mixture that contacts said catalyst device is sufficiently brief to allow the reaction $H_2S+\frac{1}{2}O_2 \rightarrow 1/x\, S_x + H_2O$ (x=2, 6 or 8) to occur, and a product gas stream is formed comprising gaseous elemental sulfur and water;
passing said product gas stream into said cooling zone and cooling said product stream to a temperature above the dewpoint of sulfur, to provide a partially cooled product stream;

passing said partially cooled product stream into a sulfur condenser and further cooling said partially cooled product stream to the dewpoint temperature of elemental sulfur, or lower, wherein said catalyst device comprises a platinum-rhodium alloy disposed on a lanthanide oxide coated refractory support.

31. The process of claim 30 wherein said catalyst device comprises a samarium oxide coated refractory support.

32. A waste gas desulfurization process comprising:
   a) providing a $H_2S$-containing waste gas stream;
   b) providing a $O_2$-containing stream;
   c) in a millisecond contact time reactor having a gas mixing zone, a reaction zone, and a cooling zone, mixing together said $H_2S$-containing gas stream and said $O_2$-containing gas stream in said mixing zone to form a reactant gas mixture, said reaction zone containing a catalyst device having activity for catalyzing the partial oxidation of $H_2S$ to elemental sulfur and water;
   d) maintaining the temperature of said reaction zone above 300° C.;
   e) passing said reactant gas mixture over said catalyst device such that the contact time between said catalyst device and a portion of said reactant gas mixture that contacts said catalyst device is sufficiently brief to allow the reaction $H_2S + \frac{1}{2}O_2 \rightarrow 1/x\ S_x + H_2O$ (x=2, 6 or 8) to occur, and a product gas stream is formed comprising gaseous elemental sulfur and water;
   f) prior to step e), in said reactor, passing a gaseous hydrocarbon over said catalyst device to carbide said catalyst device, and subsequently beginning flow of said $H_2S$ containing reactant gas mixture over said carbided catalyst device at a temperature sufficient to initiate $H_2S$ catalytic partial oxidation to form elemental sulfur and water;
   g) passing said product gas stream into said cooling zone and cooling said product stream to a temperature above the dewpoint of sulfur, to provide a partially cooled product stream;
   h) passing said partially cooled product stream into a sulfur condenser and further cooling said partially cooled product stream to the dewpoint temperature of elemental sulfur, or lower.

33. A waste gas desulfurization process comprising:
   providing a $H_2S$-containing waste gas stream;
   providing a $O_2$-containing stream;
   in a millisecond contact time reactor having a gas mixing zone, a reaction zone, and a cooling zone, mixing together said $H_2S$-containing gas stream and said $O_2$-containing gas stream in said mixing zone to form a reactant gas mixture, said reaction zone containing a catalyst device having activity for catalyzing the partial oxidation of $H_2S$ to elemental sulfur and water;
   maintaining the temperature of said reaction zone above 300° C.;
   passing said reactant gas mixture over said catalyst device such that the contact time between said catalyst device and a portion of said reactant gas mixture that contacts said catalyst device is sufficiently brief to allow the reaction $H_2S + \frac{1}{2}O_2 \rightarrow 1/x\ S_x + H_2O$ (x=2, 6 or 8) to occur, and a product gas stream is formed comprising gaseous elemental sulfur and water;
   passing said product gas stream into said cooling zone and cooling said product stream to a temperature above the dewpoint of sulfur, to provide a partially cooled product stream;
   passing said partially cooled product stream into a sulfur condenser and further cooling said partially cooled product stream to the dewpoint temperature of elemental sulfur, or lower, wherein said contact time is less than 10 milliseconds.

\* \* \* \* \*